United States Patent [19]

De Craene et al.

[11] Patent Number: 5,777,039

[45] Date of Patent: Jul. 7, 1998

[54] VINYL AROMATIC BLOCK COPOLYMERS AND COMPOSITIONS CONTAINING THEM

[75] Inventors: Luc Ives Jaak De Craene, Amsterdam, Netherlands; Martine Jeanne DuPont, Ottignies, Belgium; Eric-Jack Gerard, Amsterdam, Netherlands; Noel Raymond Maurice De Keyzer; Karin Marie-Louise Renee Morren, both of Ottignies, Belgium; Jeroen Van Westrenen, Amsterdam, Netherlands

[73] Assignee: Shell Oil Company, Houston, Tex.

[21] Appl. No.: 795,223

[22] Filed: Feb. 5, 1997

[30] Foreign Application Priority Data

Feb. 9, 1996 [EP] European Pat. Off. ............ 96300871
Jul. 18, 1996 [EP] European Pat. Off. ............ 96305273

[51] Int. Cl.$^6$ ................................................ C08F 297/04
[52] U.S. Cl. ........................... 525/314; 522/80; 522/149
[58] Field of Search ................ 525/90, 314; 522/80, 522/149

[56] References Cited

U.S. PATENT DOCUMENTS

| | | |
|---|---|---|
| 4,096,203 | 6/1978 | St. Clair. |
| 5,212,249 | 5/1993 | Richie et al. ............ 525/258 |
| 5,300,582 | 4/1994 | Debier et al. ............ 525/314 |

FOREIGN PATENT DOCUMENTS

| | | | |
|---|---|---|---|
| 0314256 | 10/1988 | European Pat. Off. ........ C08G 81/02 |
| 93/24547 | 12/1993 | WIPO ............ C08F 297/04 |
| 95/13314 | 5/1995 | WIPO. | |

*Primary Examiner*—Melvin I. Marquis
*Assistant Examiner*—D. Aylward
*Attorney, Agent, or Firm*—Donald F. Haas

[57] ABSTRACT

Block copolymers suitable for hot melt adhesive composition characterized in that they have the general formula $(AB)_p(B^1)_qX$, wherein A is poly(vinylaromatic) block and B and $B^1$ are the same or different poly(butadiene) blocks, wherein the 1,2 addition (vinyl) content is in the range of from 25 to 70% by weight, wherein X is the residue of a multivalent coupling agent having a maximum of active sites (m) in the range of from 3 to 6, wherein p and q both are integers of from 0 to m, provided that the sum of p and q values is less than m and the coupling efficiency is less than 90%, said block copolymer having an average total vinyl aromatic content in the range of from 10 to 50 wt % and preferably in the range of from 10 to 30 wt %, and having a total apparent molecular weight in the range of from 100,000 to 500,000. Adhesive, sealant, or coating compositions comprising said block copolymers and in particular radiation curable compositions, the use of said compositions, and processes for the preparation of said block copolymers are also included herein.

14 Claims, No Drawings

VINYL AROMATIC BLOCK COPOLYMERS AND COMPOSITIONS CONTAINING THEM

FIELD OF THE INVENTION

The invention relates to vinyl aromatic block copolymers and to adhesive, sealant, or coating compositions containing them. More in particular, the invention relates to block copolymers containing at least one block derived from a vinyl aromatic monomer and at least one block derived from butadiene, and to adhesive, sealant, or coating compositions containing them. Said compositions have been found to be effectively radiation curable.

BACKGROUND OF THE INVENTION

Such block copolymers and radiation curable adhesive, sealant, and coating compositions containing them are known from the PCT application published as WO 93.24547. WO 93/24547 describes block copolymers (AB)$_p$(B$^1$)$_q$X wherein A is a poly(vinylaromatic) block and B is a poly(butadiene) block, wherein X is the residue of a tetravalent coupling agent such as SiCl$_4$, SnCl$_4$ or DEAP, or a polyvalent coupling agent like divinylbenzene giving a multiarmed radial block copolymers showing a great number of arms (i.e., 6 to 20), said block copolymers having an average total vinylaromatic content of from 7 to 35 wt % and having a total apparent molecular weight in the range of from 50,000 to 1,500,000 and wherein the vinyl content in the poly(butadiene) blocks was in the range of from 35 to 70 wt %. In this publication WO 93/24547 a clear preference was taught to four armed block copolymers having the average desired structure (AB)$_2$(B)$_2$X wherein the B segments are of equal apparent molecular weight. In said publication reference was made to the values of p and q being number average values due to the formation of mixtures of four armed radial block copolymers wherein the actual values of p and q vary between zero and the maximum functionality of the coupling agent.

It will be appreciated that this simultaneous coupling reaction of the two living arm types was prescribed by the desired poly(butadiene) arms, showing a vinyl content (due to 1,2-polymerization of 1,3-butadiene) in the prescribed range of from 35 to 70 wt %, which was known to be reached only in the presence of an ether compound during polymerization, and that the normally preferred alternative coupling processes, using polyvalent coupling agents with subsequent addition of the living, intermediate polymer arms, as is known from e.g. European Patent Application 0,314,256 and U.S. Pat. No. 5,212,249, were regarded not to be applicable because as much as possible random distribution seemed required to a person skilled in the art.

From European Patent Application No. 0,314,256 a method is known for preparing asymmetric radial polymers, comprising the steps of:

a) contacting a first living polymer having a single reactive end group with a coupling agent containing a plurality of functional groups which will react with the reactive end groups, the amount of said first living polymer being substantially stoichiometrically corresponding with a part of the total amount of the functional groups, in such a way that the reaction between said first polymer and coupling agent proceeds substantially to completion, b) contacting in subsequent steps one or more living polymers, being different from said first living polymer and from each other and having a reactive end group, with the respective reaction product from each preceding step until all functional groups of the coupling agent have finally completely reacted, and c) recovering the obtained asymmetric radial polymer.

Said process was preferably used for coupling four arms selected from polymers containing only polymerized conjugated diolefins and block copolymers comprising at least one monoalkenyl aromatic hydrocarbon polymer block and at least one conjugated diolefin block by means of silicon tetrachloride.

U.S. Pat. No. 5,212,249 describes a process for preparing asymmetric radial polymers, wherein the different polymeric arms are contacted sequentially with a nonpolymerizable coupling agent, preferably being a silicon containing coupling agent, having up to 12 functional sites. Contacting in the final step in said process, which frequently but not necessarily always will be the second step in the process, was carried out in the presence of a polar compound which was known to increase the amount of vinyl content in a conjugated diolefin polymer during the polymerization thereof. The polymers obtained according to this process showed a narrower relative arm distribution of the several asymmetric radial polymers produced and a significantly increased amount of product having a devised ratio of polymeric arms. Nonpolymerizable coupling agents having 3 or 4 functional groups are most preferred.

It will be appreciated that in the case of simultaneously coupling of both types of the initially prepared of living polymer arms AB-Li and B'-Li, having a molar ratio of about 1 and a tetravalent coupling agent, the occurring individual block copolymer molecules in the mixture will be (AB)$_4$X, (AB)$_3$XB', (AB)$_2$X(B$^1$)$_2$, (AB)X(B$^1$)$_3$, and X(B$^1$)$_4$ while the desired amount of (AB)$_2$X(B$^1$)$_2$ occurs in an amount of 37.5% whatever their molecular weight, such 100% coupled block copolymers will have a weight average functionality equal to their number average functionality, i.e. both being equal to the functionality of the coupling agent used (p+q).

Similarly, in the case of simultaneous coupling of both types of the initially prepared living polymer arms AB-Li and B$^1$-Li having a molar ratio of about 1.0 and e.g. a hexavalent coupling agent according to the hereinbefore specified prior art method, the occurring individual block copolymer molecules in the mixture actually prepared will be (AB)$_6$X, (AB)$_5$(B$^1$)X, (AB)$_4$(B$^1$)$_2$X, (AB)$_3$(B$^1$)$_3$X, (AB)$_2$(B$^1$)$_4$X, AB(B$^1$)$_5$X and (B$^1$)$_6$X while the desired (AB)$_3$(B$^1$)$_3$X occurs in an amount of 31%, under the proviso that the coupling efficiency is 100%, i.e. all the original available functional sites have been finally occupied.

It will be appreciated that due to higher environmental and economical requirements, adhesive, coating or sealant compositions, derived from block copolymers of vinyl aromatic and conjugated diene, and in particular said radiation curable adhesive compositions, had to be further improved by minimizing the melt viscosity of hot melt compositions, in combination with a sufficiently high sensitiveness for UV and EB radiation, allowing an increase in processing line speeds and production rates or using weaker radiation, and avoidance of problems during the recovery of the block copolymer starting from the polymer cement.

As a result of extensive research and experimentation block copolymers have now surprisingly been found which show a combination of improved properties in radiation cured adhesive, sealant or coating compositions as well as in noncured adhesive, sealant or coating compositions, such as those usable for labels, tapes, and disposables.

SUMMARY OF THE INVENTION

Accordingly, one aspect of the present invention provides specific tailor made block copolymers (AB)$_p$(B$^1$)$_q$X, wherein A is a poly(vinyl aromatic) block and B and $B^1$ are the same or different poly(butadiene) blocks wherein the 1,2 addition (vinyl) content is in the range of from 25 to 50 wt % (% by weight) and preferably from 45 to 70 wt %, wherein X is the residue of a multivalent coupling agent having a maximum of active sites (m) in the range of from 3 to 6, wherein p and q both are integers in the range of from 0 to m, provided that the average sum of the p and q values is less than m and the coupling efficiency is less than 90% and preferably more than 55%, said block copolymers having an average total vinyl aromatic content (often referred to as average bound vinyl aromatic content or polystyrene content or PSC) in the range of from 10 to 50 wt % and preferably in the range of from 10 to 30%, and having a total apparent or weight average molecular weight measured by GPC in the range of from 100,000 to 500,000. Preferably, the sum of p and q is more than 1.5, more preferably more than 2.

DETAILED DESCRIPTION OF THE INVENTION

The coupling efficiency as used herein is the coupling efficiency as determined by gel permeation chromatography (GPC) of the total coupling process. It will be appreciated by a person skilled in the art, that the sum of the p and q values actually is determined by the coupling efficiency (CE). According to a particularly preferred embodiment said coupling efficiency is in the range of from 60 to 85%, more preferably from 70 to 84%, and even more preferably from 70 to 82%.

The above block copolymers can suitably be incorporated in adhesive, sealant, and coating compositions which are radiation cured in their final form as well as in compositions which are not cured in their final form. These block copolymers show a combination of:

- an optimum UV reactivity/melt viscosity balance, due to their high poly(conjugated diene) molecular weight and vinyl content incorporated in one radial structure;
- a distribution of composing individual molecules, some of them being particularly suited for UV sensitivity (high molecular weight) whereas smaller ones have appeared to confer high tack property before and after UV-curing; and
- the mixtures of block copolymers obtained show a significantly decreased hot melt viscosity in the complete adhesive composition under usual processing temperatures.

Since the GPC derived coupling efficiency (CE) normally is on a weight base, this means that nominal CE is always lower than the GPC measured ones. Typically, GPC derived CE depends on the molecular weight of the products obtained, whereas nominal (mole number) CE does not.

As a result, the radial multiarmed block copolymer according to the present invention $(AB)_pX(B^1)_q$ will actually comprise a collection of individual molecules, varying in both their total arms numbers and their p/q ratio, with a maximum arms number being less than the functionality of the coupling agent used. For example, a radial multiarmed block copolymer composition, derived from a tetravalent coupling agent, will be constituted of the following 14 species:
$(AB)_0X(B^1)_1$, $(AB)_1X(B^1)_0$, $(AB)_0X(B^1)_2$, $(AB)_1X(B^1)_1$, $(AB)_2X(B^1)_0$, $(AB)_0X(B^1)_3$, $(AB)_1X(B^1)_2$, $(AB)_2X(B^1)_1$, $(AB)_3X(B^1)_0$, $(AB)_0X(B^1)_4$, $(AB)_1X(B^1)_3$, $(AB)_2X(B^1)_2$, $(AB)_3X(B^1)_1$, $(AB)_4X(B^1)_0$.

Similarly, a radial multiarmed block copolymer, derived from a hexavalent coupling agent, will actually be constituted of 27 different individual molecules.

Finally, the mole fraction distribution of an $(AB)_pX(B^1)_q$ structure not coupled to completion is given by the equation:

$$F_m|i,j|=(m^i)r^i(1-r)^{m-i}(i^j)a^j(i-a)^{i-j}$$

where m stands for the functionality of the CA used and thus for the maximal number of arms;

i for the number of arms of the given species;

j for the number of load-bearing (styrene terminated) arms;

r is equal to the nominal C.E. divided by 100; and a is the $$\frac{p}{(p+q)}$$

ratio.

The above formula describes the whole distribution of species of such asymmetrical radial polymers. Preferably the respective number average values of p and q in the radial multiarmed block copolymers are in the range from 1.5 to (m-1.5), wherein m represents the maximum functionality of the coupling agent. More preferably the radial multiarmed block copolymers have been derived from trivalent or tetravalent coupling agents.

The A blocks in said block copolymers have in general an apparent or weight average molecular weight in the range of from 5,000 to 50,000, preferably from 7,000 to 20,000, and most preferably from 9,000 to 15,000. The B and $B^1$ blocks in said block copolymers may have the same or different apparent or weight average molecular weight in the range of from 15,000 to 250,000 and preferably from 20,000 to 100,000. The block copolymers of the present invention preferably have a total apparent or weight average molecular weight in the range of from 150,000 to 350,000. The vinyl content in the poly(butadiene) arm blocks is preferably in the range of from 45 to 70%.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/ number average molecular weight ratio approaches unity), and it is both convenient and adequately descriptive to report the "peak" (sometimes referred to as "apparent") molecular weight of the narrow molecular weight distribution observed. Usually, the peak value is between the number and the weight average. The peak (or apparent) molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y., 1979.
2. *Light Scattering from Polymer Solution*, M. B. Huglin, ed., Academic Press, New York, N.Y., 1972.
3. W. Kaye and A. J. Havlik, *Applied Optics*, 12, 541 (1973).
4. M. L. McConnell, *American Laboratory*, 63, May, 1978.

The block copolymers of the present invention are prepared by a process, which comprises:

a) polymerizing predominantly a monovinyl aromatic monomer in the presence of an organolithium initiator RLi and preferably an alkyl lithium, having from 4 to 6 carbon atoms, to form a living polymer ALi;

b) polymerizing predominantly butadiene to the living polymer ALi and at a previously predetermined time to the organolithium initiator RLi, giving a mixture of living polymers A-B-Li and B$^1$Li wherein the segments B and B$^1$ may have the same or different molecular weights, M|B|≧M|B$^1$| dependent on the exact moment of addition of RLi, wherein the butadiene is polymerized in a 1.2 vinyl content of from 25 to 70% and wherein the initiator RLi is added in an amount such that the molar ratio between the initiator RLi and the living polymer ALi is in the range from 0.45 to 2.20; and c) coupling the mixture of living polymers A-B-Li and B$^1$Li obtained with a multifunctional coupling agent.

With the term "predominantly butadiene" as used throughout the present specification is meant that also butadiene, which contains small amounts of other conjugated dienes or vinylaromatic monomers (<5 wt %) may be used for the above polymerization step b. Similarly, with the terms "predominantly a monovinylaromatic monomer" and "predominantly styrene" as used throughout the specification is meant monovinylaromatic monomer, respectively styrene, optionally containing small amounts of conjugated dienes or other vinyl aromatic monomers, typically less than 5% by weight. Preferably, predominantly styrene monomer is used in polymerization step a).

According to one of the preferred embodiments, a trivalent or a tetravalent coupling agent, such as trinonyl phenyl phosphite, tetrachloro silane (SiCl$_4$), tetramethoxy silane (Si(OMe)$_4$), diethyl adipate, dimethyl adipate, gamma-glycidoxy-propyl-trimethoxy-silane (gamma GPTS), and the like. Preferably, gamma GPTS or trinonyl phenyl phosphite is used.

According to the hereinbefore defined process hexafunctional (hexavalent) coupling agents may also be used, e.g. selected from bis(trichlorosilyl) alkanes, wherein the alkane group has from 2–10 carbon atoms, or bis(trialkoxy silyl) alkanes, wherein the alkane is as defined hereinbefore and the alkoxy contains from 1–4 carbon atoms, or compounds of the general formula (R$_1$—O)$_3$Si—R$_2$—O—R$_2$—Si(OR$_1$)$_3$, wherein R$_1$ is an alkylene group of 1 to 4 carbon atoms and R$_2$ is an alkylene group of 2 to 10 carbon atoms. Preferred hexafunctional coupling agents are selected from 1,2 bis(trimethoxysilyl)ethane, 1,2 bis(trichlorosilyl)ethane and 3,3'-oxydipropyl-bis(tri-methoxysilyl). The nonhalogen containing coupling agents of those specified are most preferred.

The molar ratio between the initiator RLi and the living polymer ALi in step b) is typically in the range of from 0.88 to 1.12, preferably of from 0.95 to 1.05, and most preferably the ratio will be as near as possible to 1.0 to yield nominally a x-armed block copolymer comprising x/2 AB blocks and x/2 B$^1$ blocks in average. x is the number of arms p+q.

It will be appreciated that during the polymerization of predominantly butadiene in step b), a modifier is present which causes increased vinyl contents (25–70%, preferably 45–70%). Such vinyl contents in said specified range were found to increase the UV and/or the EB radiation sensitivity of the final composition.

Modifiers to be suitably used for this purpose can be selected from the group consisting of ethers, amines, and other Lewis bases and more in particular from the group consisting of dialkyl ethers of glycols. Most preferred modifiers are selected from dialkyl ethers of ethylene glycol, containing the same or different terminal alkoxy groups and optionally bearing an alkyl substituent on the middle ethylene radical, such as monoglyme, diglyme, diethoxy ethane, 1,2-diethyoxypropane, 1-ethoxy-2-tert.-butoxy ethane, 1,2-diethoxy propane is most preferred.

Preferred organolithium initiators (RLi) are those wherein R is an aliphatic, cycloaliphatic, aromatic or alkyl-substituted aromatic hydrocarbon radial having from 1 to 20 carbon atoms, preferably from 1 to 12 carbon atoms. Particularly preferred organo lithium initiators are alkyllithium initiators having from 4 to 6 carbon atoms. Accordingly, examples of preferred organolithium initiators include one or more compounds selected from the group consisting of ethyllithium, n-propyllithium, isopropyllithium, n-butyllithium, sec-butyllithium, tert.-octyllithium, n-decyllithium, n-eicosyllithium, phenyllithium, 2-naphthyllithium, 4-butylphenyllithium, cyclohexyllithium, 4-cyclopentylbutyllithium and the like, of which sec-butyllithium is especially preferred.

It will be appreciated by a person skilled in the art that the coupling efficiency can be adjusted by the dosed molar ratio between the coupling agent and the total amount of living polymer arms. This ratio will be normally in the range of from 1.05 to 1.2.

A clear advantage shown by the block copolymers of the present invention has been found to be the attractive properties of said polymers during the recovery of them from the polymer cement, i.e. during coagulation, extrusion, and drying of polymers. The advantages which were surprisingly found to be obtained by application of the hereinbefore specified group of block copolymers of the present invention are:

a) very attractively low hot melt viscosity at usual processing temperatures of the block copolymer containing hot melt adhesive compositions which make them attractive for low temperature use applications such as in labels, tapes, and disposables;

b) in combination with simple structure of the block copolymers which can be manufactured with a controllable coupling efficiency between 70% and 85%, and have therefore a relatively low cost price;

c) the particular UV radiation sensitivity meets the most recent requirements, connected with higher processing speed of the end use compositions and/or the need of less radiation energy per surface unit, i.e. contrary to the earlier found properties of, e.g., the four armed prior art block copolymers;

d) acceptable high temperature resistance can be obtained after curing of the adhesive composition comprising the block copolymer;

e) no need of additional separate crosslinking agents, i.e. agents like acrylates, which means significantly less danger for environment and human health (toxicity of these reagents); and f) no need for strict exclusion of air during UV irradiation.

It will be appreciated that another aspect of the present invention is formed by adhesive, preferably hot melt adhesive, sealant or coating compositions which can optionally be radiation cured dependent on the end use. More in particular said hot melt adhesive compositions will comprise the hereinbefore specified UV and/or EB radiation sensitive block copolymers together with one or more usual adjuvants selected from tackifying resin, extender oil and/or plasticizer, petroleum derived waxes, antioxidant, photoinitiator (in case of UV irradiation curing) and optionally a resin which is compatible with the monovinyl aromatic block.

The block copolymer by itself is not usually sufficiently tacky or sticky. Therefore, for adhesive compositions it is normally necessary to add a tackifying resin that is compatible with the elastomeric poly(butadiene) blocks. The tackifiers are selected for their ability to tackify the elastomeric block and their compatibility therewith. The amount of tackifying resin or resins in total typically varies from 10 to 300 parts by weight per hundred parts (phr; the r refers to "rubber," another term used for block copolymer in this art) of block copolymer, preferably from 50 to 200 phr.

In the adhesive compositions according to the present invention it has been found preferably that the tackifying resin should have a low level of unsaturation in order to achieve low radiation curing dosage of the adhesive composition, preferably less than 5% unsaturation, more preferably less than 1% unsaturation. The level of unsaturation can suitably be determined by NMR.

Examples of tackifying resins which are useful in the adhesive compositions of the present invention include saturated resins, esters of resins, polyterpenes, terpene phenol resins, and polymerized mixed olefins or mixtures thereof with hydrogenated resins being preferred. Mixtures of resins, typically having different levels of unsaturation and different softening points, may also be used but are less preferred due to possible uncontrollable side reactions.

Examples of useful tackifying resins are ESCOREZ 5300 series (ESCOREZ is a trademark); REGALITE R91, R101, S100, S260 (REGALITE is a trademark); REGALREZ 1018, 3102, 6108, 5095 (REGALREZ is a trademark); ZONATAC Lite series like the ZONATAC 105 LITE (ZONATAC is a trademark); HERCULES MBG 264 and the like.

Optionally a modifying resin, that is a resin that is compatible with the poly(vinyl aromatic) blocks, may be added. Preferably modifying resins are selected that do not appreciably hinder the radiation curing process as a result of mixing on a molecular level with the poly(butadiene) blocks. A modifying resin is said not to appreciably hinder the radiation curing process if the time required to complete the curing is less than two times the time required for the curing to complete in the absence of a modifying resin. Compatibility is judged by the method disclosed in U.S. Pat. No. 3,917,607 which is herein incorporated by reference. Normally the resin should have a softening point above 100° C. as determined by ASTM method E28.

The adhesive, sealant, or coating compositions of the instant invention may also contain plasticizers such as rubber extending or compound oils in order to provide wetting action and/or viscosity control. These plasticizers are well-known in the art and may include both high paraffinic or naphthenic content oils and aromatic content oils. Said plasticizers include not only the usual plasticizers but also embrace the use of olefin oligomers and low molecular weight polymers as well as vegetable and animal oil and their derivatives. The petroleum derived oils which may be employed are relatively high boiling materials and preferably contain only a minor proportion of aromatic hydrocarbons (preferably less than 30 percent and, more preferably, less than 15 percent by weight of the oil).

Such oils are for example SHELLFLEX 451, 4510 (SHELLFLEX is a trademark); ONDINA 68 (ONDINA is a trademark); RISELA 68 (RISELA is a trademark); PRIMOL 352 (PRIMOL is a trademark); WITCO 260 (WITCO is a trademark); and the like, of which ONDINA, RISELA, and PRIMOL oils are known as nonaromatic oils. The oligomers may be polypropylene, polybutene, hydrogenated polyisoprene, hydrogenated polybutadiene, or the like having average molecular weights preferably between 200 and about 10,000. Vegetable and animal oils include glyceryl esters of fatty acids and polymerization products thereof. The amount of plasticizers and oil employed varies from 0 to 500 phr (parts by weight per hundred parts by weight of block copolymer), preferably from 0 to 150 phr, and more preferably from 5 to 120 phr.

Various petroleum derived waxes may also be present in the composition in order to impart fluidity in the molten condition of the adhesive and flexibility to the set adhesive and to serve as a wetting agent for bonding cellulosic fibers. The term "petroleum derived wax" includes both paraffin and microcrystalline waxes having a melting point within the range of about 54° C. to about 107° C. as well as synthetic waxes such as low molecular weight polyethylene or Fischer-Tropsch waxes. The amount of petroleum derived waxes employed herein varies from 0 to about 100 phr, preferably from 0 to about 15 phr.

It will be appreciated that the best results (i.e. satisfactory curing achieved with minimum radiation dosage) are achieved when, like the tackifying resins, the plasticizers and oils contain low levels of unsaturation, preferably less than 5% unsaturation, more preferably less than 1% unsaturation. Additionally, it is also preferred to minimize the aromatic content thereof.

The adhesive, sealant, or coating compositions may further contain conventional additives such as e.g. stabilizers, pigments, fillers, and the like, but the compositions should preferably be free of other additives and impurities which adversely affect the adhesive, sealant, or coating properties of the composition, and particularly the high temperature properties thereof.

Stabilizers and oxidation inhibitors are typically added to the commercially available compounds in order to protect the ingredients against degradation during preparation and use of the adhesive compositions, however without interfering with the radiation curing of the polymer. Combinations of stabilizers are often more effective due to the different mechanisms of degradation to which various polymers are subject.

Certain hindered phenols, organo-metallic compounds, aromatic amines, aromatic phosphites, and sulphur compounds are useful for this purpose. Examples of effective types of these materials include phenolic antioxidants, thic compounds and tris-(nonylated phenyl) phosphites. Examples of commercially available antioxidants are "IRGANOX 565" 2,4-bis-(n-octylthio)-6-(4-hydroxy-3,5-di-tertiary-butyl anilino)-1,3,5-triazine, "IONOL" 2,6-di-tertiary-butyl-4-methyl phenol, "IRGANOX 1010" tetrakis-ethylene-(3,5-di-tertiary-butyl-4-hydroxy-hydrocinnamate, methane, "IONOX 330" 3,4,6-tris (3,5-di-tertiary-butyl-p hydroxybenzyl)-1,3,5-trimethylbenzene and "POLYGARI HR" tris-(2,4-di-tertiary-butyl-phenyl) phosphite. In genera from about 0.01 percent to about 5.0 percent by weight o one or more antioxidants is included in the adhesive, sealant or coating compositions.

The adhesive, sealant, or coating compositions of the present invention may be prepared by blending bloc copolymers, tackifying resins and other desired ingredients at an elevated temperature, e.g., at about 160° C. (hot-melt) using a Z blade mixer or extruder or any other usual type of mixer for that purpose. Adhesives of the present invention are especially suited for preparation as 100% solids hot-melt adhesives, since they give relatively low processing viscosities, less than one hundred thousand centipoise, and adequate pot life, up to several hours, at processing temperature of about 150° C. to 180° C. A preferred method for processing is the use of an extruder to mix the adhesive and feed the coating die as is disclosed in U.S. Pat. No. 3,984,509 which is herein incorporated by reference.

As indicated earlier the compositions of the present invention can be cured depending on the final end use of the compositions. Such curing is performed by exposure to high energy ionizing radiation such as electron beam radiation or by UV radiation.

The electron beam radiation or high energy ionizing radiation which is employed to effect the crosslinking reaction can be obtained from any suitable source such as an atomic pile, an electron gun, a resonant transformer accelerator, a Van de Graaf electron accelerator, a Lineac electron accelerator, a betatron, a synchrotron, a cyclotron, or the like. Radiation from these sources will produce ionizing radiation such as electrons, protons, neutrons, deuterons, gamma rays, X rays, alpha particles, and beta particles.

The crosslinking reaction is conveniently effected at room temperature, but it can be conducted at depressed or elevated temperatures if desired.

Surprisingly there has been found that there is no need for strict exclusion of air during UV irradiation. Therefore it is no longer necessary to perform the crosslinking by UV irradiating the composition, being sandwiched between substrates such as when the composition is utilized as a tie-layer between these substrates, or in isolated equipment filled with an oxygen free inert atmosphere after evacuation. It will be appreciated by a person skilled in the art that said curing by irradiation in an oxygen containing atmosphere, such as air, provides a significant cost savings.

The amount of irradiation required to produce a satisfactory cure depends primarily upon the type and concentration of the block copolymer employed and the unsaturation level present in the composition. Suitable dosages of electron beam irradiation are in the range from 0.5 to 8 Mrad, preferably about 4 Mrad to about 8 Mrad, and more preferably about 6 Mrad to about 8 Mrad.

The adhesive compositions may preferably be cured by exposure to ultraviolet radiation for a period of time sufficient to effect the desired amount of crosslinking. Ordinarily, when use of ultraviolet light is contemplated, the adhesive composition will be formulated with from 0.2 to 30% parts by weight of an ultraviolet sensitizing component (photoinitiator) per 100 parts by weight of the block copolymer. The photoinitiators may preferably be included in an amount in the range of from 1 to 10 parts by weight per 100 parts by weight of block copolymer and more preferably in an amount in the range of from 1 to 5 parts by weight.

Any of the known ultraviolet sensitizing compounds may be used. A preferred group of photoinitiators is selected from the group consisting of:

(1) at least one benzophenone of the general formula (I)

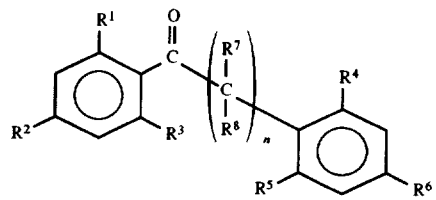

wherein $R^1$ to $R^8$ independently represent hydrogen or an alkyl group having from 1 to 4 carbon atoms, preferably methyl, and wherein $R^7$ and/or $R^8$ in addition may represent alkoxy of 1 to 4 carbon atoms and wherein n has a value of 0, 1 or 2, optionally in combination with at least one tertiary amine.

(2) at least one sulphur-containing carbonyl compound, wherein the carbonyl group is directly bound to at least one aromatic ring, preferably of the general formula II

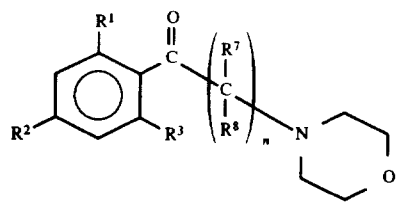

wherein $R^9$, $R^{10}$, $R^{11}$ each may represent hydrogen, alkyl of 1–4 carbon atoms or an alkylthio group, having 1 to 4 carbon atoms, and (3) mixtures of (1) and (2)

Examples of suitable compounds of category (1) are benzo-phenone, 2,4,6-trimethylbenzophenone, 4-methylbenzophenone and an eutactic mixture of 2,4,6-trimethylbenzophenone and 4-methylbenzo-phenone (ESACURE TZT) and 2,2-dimethoxy-1,2-diphenylethan-1-one (IRGACURE 651) (ESACURE and IRGACURE are trademarks). These compounds may e employed in combination with tertiary amines, such as e.g. UVECRYL 7100 (UVECRYL is a trademark).

Category (2) embraces compounds such as e.g. 2-methyl-1-[4-(methylthio)phenyl]-2-morpholinopropanone-1, commercially available as IRGACURE 907 (IRGACURE is a trademark).

An example of suitable mixtures (category (3)) is a mixture of 15% by weight of a mixture of 2-isopropylthioxanthone and 4-isopropylthioxanthone and 4-isopropylthioxanthone, and 85% by weight of a mixture of 2,4,6-trimethylbenzophenone and 4-methyl-benzophenone. This mixture is commercially available under the tradename ESACURE X15.

Photoinitiators of any one of the above categories (1), (2), and (3) may also be used in combination with other photoinitiators, such as e.g. UVECRYL P115. Particularly useful is a combination of benzophenone and said UVECRYL P115.

In a preferred embodiment of the present invention, the photoinitiator is selected from the group consisting of (I) benzophenone, (ii) a mixture of benzophenone and a tertiary amine containing a carbonyl group which is directly bonded to at least one aromatic ring, (iii) 2-methyl-1-[4-(methylthio) phenyl]-2-morpholinopropanone-1 (IRGACURE 907), (iv) 2,2-dimethoxy-1,2-diphenylethan-1-one (IRGACURE 651), of which (iii) and (iv) are most preferred.

It will be appreciated that the length of the exposure will be dependent on the intensity of the radiation, the amount and particular type of the ultraviolet sensitizing compound employed, thickness of the (adhesive) layer to be cured, etc.

The UV irradiation used for crosslinking the block copolymer composition of the present invention in principle may be any UV source having an output spectrum showing one or more peaks at wavelengths between 200 and 500 nonometer (nm). Particularly suitable UV sources are Fusion bulb lamps. H and D bulb lamps (linear power 118 W/cm (300 W/inch) and 236 W/cm (600 W/inch) are particularly useful, while a combination of D bulb and H bulb lamps can also be suitably applied.

The exposure to UV irradiation may be performed by any known method. A suitable method for instance is exposing a sample either in a layer obtained from a hot melt or in a layer obtained by solvent coating to UV irradiation by passing said sample at a certain speed (expressed in meters per minute, m/min) underneath the UV source. If necessary, the exposure to irradiation may be repeated one or more times, e.g. by repeatedly passing the sample underneath the UV source or by passing the sample underneath two or more lamps positioned in series, in order to accomplish sufficient curing. The lower the total irradiation dose and the higher the speed with which the sample can be passed underneath the UV source for obtaining sufficient and satisfactory curing, the better the curing ability of the said sample.

A preferred use of the present formulation is in the preparation of pressure-sensitive adhesive (PSA) tapes or in the manufacture of labels. The pressure-sensitive adhesive tape comprises a flexible backing sheet and a layer of the adhesive composition of the instant invention coated on one major surface of the backing sheet. The backing sheet may be a plastic film, paper, or any other suitable material and the tape may include various other layers or coatings, such as primers, release coatings and the like, which are used in the manufacture of pressure-sensitive adhesive tapes.

According to a further aspect, the present invention relates to hot melt adhesive compositions for use in the production of disposables such as diapers.

The said hot melt adhesive compositions comprise the block copolymers of the present invention, preferably those block copolymers where q is zero. The adhesive composition typically further comprises a tackifying resin and, optionally, plasticizer. A preferred composition typically comprises from 40 to 70% by weight of tackifying resin, from 15 to 35% by weight of block copolymer and from 10 to 30% by weight of plasticizer. Like in other adhesive compositions, other additives such as antioxidants and the like, may be present as well, preferably in an amount not exceeding 20% by weight.

The invention is further illustrated by means of the following examples, however, without restricting the scope of the invention to these preferred embodiments.

EXAMPLE 1

Preparation of polymer P1

The cyclohexane, styrene and butadiene were previously led through an ALCOA (trademark) aluminum oxide column to remove optional stabilizers and remaining traces of water. The ALCOA column had been activated at 350° C., while purging with nitrogen. The reactor and conduits had been purged with nitrogen too. 5 kg styrene were dosed to cyclohexane (180 liter) at 40° C. in a 300 liter reactor with a helix stirrer having a speed of 120 rpm. The reaction mixture is heated to 45° C. Whereafter, 330 ml of sec.butyl lithium of 1.4M were added.

A first sample was taken from the reaction mixture after one hour polymerization time at 50° C. and analyzed by GPC-UV detection (real peak mol. weight=11,410). A second amount of 1.542 kg of styrene was dosed in order to get the desired molecular weight and the reaction was continued at 50° C. The final molecular weight of the styrene block was determined by GPC-UV analysis on a second sample taken after sufficient reaction time. The reaction mixtures was cooled to 40° C. (real peak mol weight=14,520).

After addition of 225 ml of sec butyllithium (1.4M), 63.18 ml diethoxypropane (DEP) were added and subsequently 29.85 kg of butadiene. The butadiene dosing started at 40° C. From the start of the dosing the reactor was heated to 70° C. in 20 minutes, the time needed to dose 7.00 kg of butadiene (forced adiabatic process). The remainder of the butadiene (22.85 kg) was dosed isothermally at 70° C. The reaction time was 10 minutes after the end of the butadiene dosing.

A sample was taken after completion of the reaction and analyzed (apparent peak mol weight=97,150). The living polymers were coupled with 43.53 ml of gamma-GPTS.

The reaction mixture was terminated with 9 ml of methanol after 60 minutes coupling time. The mixture was cooled to 0° C. and a sample of polymer P1 was taken for analysis. (GPC+UV+RI detection: HPS content in UV 2.9%, coupling efficiency 85%, vinyl content 49.0%, styrene content 18.8%, apparent mol weight: 254,300–258,600).

The reaction mixture was transferred to a blending vessel. 0.4 phr of Polygard HR (tris-(2,4-ditert butylphenyl) phosphite) and 0.2 phr of Ionol (71.39) dissolved together in 200 ml cyclohexane were added and blended in. Subsequently 800 liters of demineralized water was added to the coagulation vessel and coagulation at 105° C. with steam was performed. The coagulated rubber crumbs and condensed steam were cooled to 30° C., and the crumbs were separated from the water and dried in a hot air oven at 50° C. until the water content was about 0.2%.

COMPARATIVE EXAMPLE 1

Preparation of Polymer Pa

To a first 5 liter reactor about 3 liters of cyclohexane were added, which was stripped during about half an hour with nitrogen. After addition of 150 g of styrene, the reactor contents were titrated at room temperature with a 12 wt % solution of sec.butyllithium (BuLi) in cyclohexane, whereby any impurities present in the reactor mixture were scavenged. Hereafter 15.6 mmol BuLi were added and the temperature was raised to and maintained at 50° C. After about 30 minutes the poly(styrene) Li block had been formed and the contents were transferred to a second 10 liter reactor, which had previously been charged with about 3 liters of cyclohexane stripped with nitrogen during about half an hour and a varying amount of diethoxy ethane modifier and 350 g of butadiene which has previously been titrated with a butyllithium solution.

The temperature was raised to 50° C. A predetermined additional amount of BuLi was added to the second reactor in varying amounts and 500 g of butadiene was gradually dosed over about 30 minutes. Thereafter the second reactor was brought to and kept at 80° C., 7.7 mmoles of SiCl$_4$ were added and the coupling reaction was performed in about 30 minutes. A coupling efficiency (CE of 96% was found, while the vinyl content of the poly(butadiene) was found to be 54%.

After about 2 hours 10 g of 2,6-di-tert.-butyl-4-methylphenyl were added. Hereafter the solvent was removed by steam stripping and the obtained polymer (Pa was dried in an oven at 60° C. during 5–6 hours.

EXAMPLE 2

Preparation of polymer P2

250 g of styrene were added to 18 liters of cyclohexane a 50° C. after the addition of 20 mmol sec-butyl lithium. The reaction was completed after 40 minutes. Thereafter, 8 ml of 1,2-diethoxypropane (DEP) were added. The temperature o the reactor was raised to 60° C., followed by the addition o 20 mmol of sec-butyl lithium. Then 1414 g of butadien were dosed gradually to the reaction mixture in 15 minutes. The polymerization was allowed to proceed at 60° C. for 120 minutes. Then 1.96 ml bis(trimethoxysilyl)ethane (BTMSE) were added to couple the living chains. After the reaction mixture was cooled down to 20° C. after 12 hours, 20 ml of ethanol were added.

The polymer was stabilized with 0.2 phr IONOL and 0.4 phr POLYGARD HR (tris-2,4-ditert butylphenyl)phosphite) and isolated by steam stripping to give white crumbs. The product P2 was analyzed by ASTM D3536. The vinyl content is measured by infrared spectroscopy described generically in ASTM D 3677.

EXAMPLE 3
Preparation of polymer P3

225 g of styrene were added to 18 liters of cyclohexane at 50° C. after the addition of 21 mmol sec-butyl lithium. The reaction was completed after 40 minutes. Thereafter, 14 ml of 1,2-diethoxypropane (DEP) were added. The temperature of the reactor was raised to 70° C. followed by the addition of 21 mmol of sec-butyl lithium. Then 1275 g of butadiene were dosed gradually to the reaction mixture in 20 minutes. The polymerization was allowed to proceed at 70° C. for 60 minutes. Then 2.12 ml bis(trimethoxysilyl)ethane (BTMSE) were added to couple the 'living' chains. After the reaction mixture was cooled down to 20° C. after 12 hours, 20 ml of ethanol were added. The polymer was stabilized with 0.2 phr IONOL and 0.4 phr POLYGARD and isolated by steam stripping to give white crumbs. The product P3 was analyzed by ASTM D3536. The vinyl content is measured by infrared spectroscopy described generically in ASTM D3677.

EXAMPLE 4
Preparation of polymer P4

225 g of styrene were added to 18 liters of cyclohexane at 50° C. after the addition of 21.5 mmol sec-butyl lithium. The reaction was completed after 40 minutes. Thereafter, 13 ml of 1,2-diethoxy-propane (DEP) were added. The temperature of the reactor was raised to 70° C. Then 294 g of butadiene were dosed gradually to the reaction mixture in 6 minutes. The polymerization was allowed to proceed at 70° C. for 30 minutes. Thereafter 21.5 mmol sec-butyl lithium and 1 ml DEP were added, immediately followed by adding 981 g of butadiene gradually in 13 minutes. The polymerization was allowed to proceed at 70° C. for 60 minutes. Then 2.19 ml (bis(tri-methoxysilyl)ethane (BTMSE) were added to couple the living chains. After the reaction mixture was cooled down to 20° C. after 12 hours, 20 ml of ethanol were added.

The polymer was stabilized with 0.2 phr IONOL and 0.4 phr POLYGARD and isolated by steam stripping to give white crumbs. The product P4 was analyzed by ASTM D3536. The vinyl content is measured by infrared spectroscopy described generically in ASTM D3677.

COMPARATIVE EXAMPLE 2
Preparation of a 6 armed polymer Pb 200 g of styrene were added to 18 liters of cyclohexane at 50° C. after the addition of 22 mmol sec-butyl lithium. The reaction was completed after 40 minutes. Thereafter, 4.7 ml of 1,2-diethoxypropane (DEP) were added. The temperature of the reactor was kept at 30° C. followed by the addition of 44 mmol of sec-butyl lithium. Then 1800 g of butadiene were dosed gradually to the reaction mixture in 40 minutes. The polymerization was allowed to proceed at 50° C. for 100 minutes. Then 2.3 ml (bis(trichlorosilyl)ethane (BTCSE) were added to couple the 'living' chains. After the reaction mixture was cooled down to 20° C. after 12 hours, 20 ml of ethanol were added.

The polymer was stabilized with 0.2 phr IONOL and 0.4 phr POLYGARD and isolated by steam stripping to give white crumbs. The product Pb was analyzed by ASTM D3536. The vinyl content is measured by infrared spectroscopy described generally in ASTM D3677.

| Block Polymer | MW SB-Li[1] (kg/mol) | MW B-Li[2] (kg/mol) | MW (SB)(B)X[3] (kg/mol) | CE[4] (%) | Vinyl[5] (%) |
|---|---|---|---|---|---|
| P1 | 97.2 | 82.7 | 256 | 79 | 49 |
| P2 | 85.6 | 70.6 | 280 | 78 | 61 |
| P3 | 75.2 | 73.0 | 254 | 80 | 62 |
| P4 | 80.5 | 45.3 | 255 | 84 | 63 |
| Pa | 71 | 60.2 | 251 | 96 | 54 |
| Pb | 58.9 | 50.4 | 247 | 91 | 57 |

(1)Apparent molecular weight by ASTM D3536 as detected by UV absorption.

(2)Apparent molecular weight by ASTM D3536 as detected by refractive index.

(3)Apparent molecular weight by ASTM D3536 as detected by absorption of the product formed after coupling. The main peaks are listed.

(4)Coupling efficiency as determined from the GPC diagram obtained by ASTM D3536 as detected by UV absorption: The percentage of coupled product (i.e. product with a higher molecular weight than S-B) formed with respect to the total amount of SB present prior to coupling.

(5)As determined infrared spectroscopy described generically in ASTM D3677.

TABLE I

Compositions:
Adhesive compositions (same Tg and polymer content)***

|  | C1 | C2 | C3 | C4 | Ca | Cb |
|---|---|---|---|---|---|---|
| block copol | 100P1 | 100P2 | 100P3 | 100P4 | 100Pa | 100Pb |
| REGALITE R 91* | 75 | 122 | 120 | 121 | 147 | 93 |
| REGALREZ 1018** | 135 | 88 | 90 | 89 | 63 | 117 |
| IRGACURE 651 | 3 | 3 | 3 | 3 | 3 | 3 |
| IRGANOX 1010 | 2 | 2 | 2 | 2 | 2 | 2 |

*hydrogenated hydrocarbon resin, unsaturation index (Ui): 0.9%.
**hydrogenated hydrocarbon liquid resin, UI: 5.0%.
***parts by weight

TABLE II

Hot Melt Viscosities (HMV) (Brookfield Pa.s)

|  | C1 | C2 | C3 | C4 | Ca | Cb |
|---|---|---|---|---|---|---|
| HMV 160° C. | 10.0 | 22.5 | 12.3 | 11.0 | 11.0 | 10.4 |
| HMV 160° C. after 8 hrs | 9.7 | 25.0 | 15.1 | 13.1 | 12.0 | 11.0 |

For HMV, formulations other than those listed in Table I were used:
C₁**    C₂ = C₃ = C₄ = Ca = Cb**

| polymer | 100 | polymer | 100 |
|---|---|---|---|
| HERCULES MBG 264*** | 225 | REGALITE R91 | 150 |
| TUFFLO 6056 | 75 | REGALREZ 1018 | 60 |
| IRGACURE 651 | 3 | IRGACURE 651 | 3 |
| IRGANOX 1010 | 2 | IRGANOX 1010 | 9 |

***partially hydrogenated hydrocarbon resin, Ui: 19.7%.
****parts by weight.

TABLE III

Loop Tack After 1 pass under D&H F-300 W lamps N/25 mm

| Speed m/min | C1 | C2 | C3 | C4 | Ca | Cb |
|---|---|---|---|---|---|---|
| 10 | 11 | 13 | 11 | 0.3 | 1* | 11 |
| 15 | 10 | 14 | 13 | 0 | 2* | — |
| 20 | 11 | 16 | 15 | 0.7 | 5* | — |
| 25 | 12 | 15 | 15 | 3 | 3* | 14 |
| non-irradiated | 11 | 20 | 20 | 8 | 34* | 17 |

*–Maximal load (Zippery Tack).

TABLE IV

SAFT results (Stainless Steel/500 g/°C.) after irradiation in one pass under a combination of a F-300 W D + H bulbs (irradiated in the presence of air)

| Speed m/min | C1 | C2 | C3 | C4 | Ca | Cb |
|---|---|---|---|---|---|---|
| 10 | >160 | >160 | >160 | 128 | >160 | 77 |
| 15 | >160 | >160 | >160 | 82 | 79 | 72 |
| 20 | 107 | 96 | 84 | 75 | 78 | nm* |
| 25 | 99 | 75 | 83 | 70 | 77 | nm* |

*nm = not measured

TABLE V

Adhesive compositions (having varying block copolymer contents to reach about the same Tg as much as possible)*

| | C11 | C12 | C13 | C14 | C15 |
|---|---|---|---|---|---|
| block copolymer | 100 $P_1$ | 100 $P_1$ | 100 $P_1$ | 100 $P_1$ | 100 $P_1$ |
| REGALITE R91 | 70 | 70 | 144 | 175 | 115 |
| REGALREZ 1018 | 230 | 116 | 42 | 125 | 118 |
| IRGANOX 1010 | 2 | 2 | 2 | 2 | 2 |
| IRGACURE 651 | 3 | 3 | 3 | 3 | 3 |

*parts by weight.

TABLE VI

Loop Tack (LT), Peel Adhesion (PA), Holding Power (HP), Shear Adhesion Failure Temperature (SAFT) and Hot Melt Viscosity (HMV) values before and after irradiation (one pass under D and H F300 W bulb (in presence of air)

| Adh. Comp. | Tg °C. | Pol. Cont. % | LT (N/mm₂) ini | LT (N/mm₂) 1 pass | PA (N/mm₂) ini | PA (N/mm₂) 1 pass | HP 95° C. (hrs) ini | HP 95° C. (hrs) 1 pass | SAFT (°C.) ini | SAFT (°C.) 1 pass | HMV (Pa·s) |
|---|---|---|---|---|---|---|---|---|---|---|---|
| C11 | -25 | 25 | 16.9 | 12.7 | 12.5 | 12.7 | 0.0 | >140 | 77 | 160 | 10 |
| C12 | -25 | 35 | 15.5 | 9.7 | 9.7 | 9.5 | 0.1 | >140 | 91 | 160 | 55 |
| C13 | -10 | 35 | 19.6Z | 0 | 17.3 | 8.8 | 0.3 | >140 | 101 | 160 | 91 |
| C14 | -10 | 25 | 25.8 | 7.0Z | 21.2 | 23.6CF | 0.0 | >140 | 84 | 160 | 17 |
| C15 | -17.5 | 30 | 19.9 | 10.2 | 15.3 | 15.7 | 0.1 | >140 | 88 | 160 | 29 |

CF = cohesion failure
ini = initial (before UV curing)
Z = Zippery tack (when zipper tack occurred, the highest LT value was taken)

TABLE VII

Adhesive compositions (having varying block copolymer content to reach as much as possible the same Tg)*

| | C21 | C22 | C23 | C24 | C25 |
|---|---|---|---|---|---|
| block copolymer | 100 $P_1$ | 100 $P_1$ | 100 $P_1$ | 100 $P_1$ | 100 $P_1$ |
| HERCULES MBG 264 | 80 | 80 | 164 | 200 | 131 |
| REGALREZ 1018 | 220 | 106 | 22 | 100 | 102 |
| IRGANOX 1010 | 2 | 2 | 2 | 2 | 2 |
| IRGACURE 651 | 3 | 3 | 3 | 3 | 3 |

*parts by weight

TABLE VIII

Loop Tack, Peel Adhesion, Holding Power, Shear Adhesion Failure Temperature and Hot Melt Viscosity values before and after irradiation (one pass under D and H F300 W bulb (in the presence of air)

| Adh. Comp. | Tg °C. | Pol. Cont. % | LT (N/mm$_2$) ini | LT (N/mm$_2$) 1 pass | PA (N/mm$_2$) ini | PA (N/mm$_2$) 1 pass | HP 95° C. (hrs) ini | HP 95° C. (hrs) 1 pass | SAFT (°C.) ini | SAFT (°C.) 1 pass | HMV (Pa · s) |
|---|---|---|---|---|---|---|---|---|---|---|---|
| C21 | −25 | 25 | 17.1 | 13.6 | 12.2 | 13.0 | 0.0 | >140 | 73 | 160 | 12 |
| C22 | −25 | 35 | 15.9 | 12.9 | 12.1 | 11.8 | 0.1 | >140 | 86 | 160 | 53 |
| C23 | −10 | 35 | 18.1 Z | 13.4Z | 21.9 | 18.4 | 0.3 | >140 | 97 | 160 | 110 |
| C24 | −10 | 25 | 30.9 Z, CF | 18.1Z | 25.9CF | 23 | 0.0 | >140 | 80 | 160 | 19 |
| C25 | −17.5 | 30 | 22 | 19.0 | 15.5 | 15.5 | 0.0 | >140 | 83 | 160 | 32 |

TABLE IX

Properties of neat block coolymers, obtained by coupling living polymer arms, showing varying molecular weights of AB and B$^1$ blocks, with bis(trimethoxysilyl) ethane

| Properties | Block Copolymers | | |
|---|---|---|---|
| | P3 | P4 | P2 |
| Poly(Styrene) Content NMR (%)* | 14.6 | 14.6 | 14.7 |
| Vinyl Content NMR (%)* | 63.3 | 62.7 | 64.2 |
| Coupling Efficiency (%)* | 80 | 84 | 78 |
| Degree of Branching | 4.3 | 4.2 | 3.7 |
| Tg Onset DSC (°C.) | −46 | −47 | −47 |
| Shore A (3s) | 31 | 28 | 28 |
| Elong. at Break (%) | 800 | 780 | 820 |
| Tensile Strength (MPa) | 6.3 | 5.2 | 4.1 |
| Modulus 300% (MPa) | 1.08 | 1.06 | 0.74 |
| Melt Flow Rate (g/10 min) | 3 | 9 | 1 |

*by weight

TABLE X

Adhesive Test Methods

| Property | Test Procedure |
|---|---|
| Rolling Ball Tack | PSTC 6; ASTM D3121-73 |
| Loop Tack | FTM 9 |
| 180° Peel Adhesion | PSTC 1; ASTM D3330M-83 |
| Holding Power 2 kg/23° C. | ASTM D-3654-82; FTM 8 |
| Shear Adhesion Failure Temperature | Method as specified* |
| Hot Melt Viscosity at 160° C. | ASTM D3236-73 |
| Melt Flow Rate | ISO 1133 |
| Solution Viscosity | SMS 2406 |
| Stress Strain Properties | ASTM 412D |
| Gel Permeation Chromatography | SMS 2537-90C |

*This test is designed to give an indication of the short-term heat resistance under defined conditions, such as loads and temperature increase.

The SAFT test is carried out in an air circulating oven equipped with an air circulating oven equipped with an electro-mechanical device monitoring a stepwise increase of the temperature. Inside the oven, supports are attached to the side walls on which six aluminum racks can be placed under an angle of 2°. These racks support 6 metal or glass plates onto which the tape samples will be applied. These plates rest against a narrow ridge in which 6 slots are cut. The free part of the coated film on which the weights are hung passes along these slots.

One end of the strip is centered and stuck partially onto a glass plate. The other end of the strip is held so that it does not make contact with the plate but is positioned below. The strip is pressed firmly against the glass plate avoiding entrapment of air bubbles. The adhered part of the strip is cut at 1" of the glass edge. The surface is then 25.4 mm×25.4 mm (1 inch$^2$). Finally, the test specimens are stored for 24 hours.

The racks with the samples are installed in the oven and weights of 500 or 1000 grams are hung to the free end of the strip and clamped with "Hofmann" hose clamps. These weights are initially supported by a base plate which can move up and down by means of a "lab jack." Just before the start of the test, the base plate is moved downwards so that the weights hang freely above the micro or photo-electrical switches. These switches are connected to a counter. The temperature in the oven is displayed on a digital thermometer.

When a strip falls, the weight falls down on the mirco switch and the timer is stopped. When the time to failure is known, the temperature at which failure occurred can be read off from the calculated time/temperature diagram. The SAFT value is the average of two temperatures recorded with two samples.

We claim:

1. Block copolymers usable for radiation curable hot melt adhesive composition, characterized in that they have the general formula $(AB)_p(B^1)_qX$, wherein A is a poly(vinylaromatic) block and B and B$^1$ are the same or different poly(butadiene) blocks, wherein the 1,2 addition (vinyl) content of the poly(butadiene) blocks is in the range of from 25 to 70% by weight, wherein X is the residue of a multivalent coupling agent having a maximum of active sites (m) in the range of from 3 to 6, wherein p and q both have a number average value in the range from 1.5 to (m-1.5) provided that the average sum of p and q is less than m and the coupling efficiency is less than 90%, said block copolymer having an average total vinyl aromatic content in the range of from 10 to 50 wt %, and having a total apparent molecular weight (as measured by GPC) in the range of from 100.000 to 500.000.

2. Block copolymers according to claim 1 characterized in that X is the residue of tetravalent or trivalent coupling agent.

3. Block copolymers according to claim 1 characterized in that the B and B$^1$ blocks each have an apparent molecular weight (as measured by GPC) in the range of from 20,000 to 100,000.

4. Block copolymers according to claim 1 characterized in that the A block has an apparent molecular weight (as measured by GPC) in the range from 7,000 to 20,000.

5. Block copolymers according to claim 1 characterized in that the total apparent molecular weight (as measured by GPC) is in the range of from 150,000 to 350,000.

6. Block copolymers according to claim 1 characterized in that the vinyl content in the poly(butadiene) blocks is in the range of from 45 to 70% by weight.

7. Adhesive, sealant, or coating compositions, comprising one or more block copolymers according to claim 1.

8. Radiation curable hot melt adhesive compositions, comprising one or more block copolymers according to claim 1 and one or more adjuvants selected from tackifying resin, extender oil, plasticizer, petroleum derived wax, antioxidant, photoinitiator and modifying resin.

9. UV radiation curable adhesive compositions, comprising one or more block copolymers according to claim 1 together with at least one photo initiator.

10. UV radiation curable adhesive compositions according to claim 9 characterized in that the photoinitiator has been included in an amount in the range of from 1 to 5 parts by weight per 100 parts by weight of block copolymer.

11. Pressure sensitive radiation curable tapes or labels comprising a flexible backing sheet and a layer of the adhesive composition according to claim 7 coated on one major surface of the backing sheet.

12. Radiation cured adhesive, sealant, or coating compositions obtainable by radiation curing compositions according to claim 7 in air.

13. Process for the preparation of radiation sensitive block copolymers according to claim 1 comprising:

(a) polymerizing predominantly a monovinyl aromatic monomer in the presence of an organolithium initiator RLi having from 4 to 6 carbon atoms to form a living polymer ALi where A is a block of polymerized monovinyl aromatic monomer;

(b) polymerizing predominantly butadiene to the living polymer ALi and adding the organolithium initiator RLi wherein the segments B and $B^1$ are block of polymerized butadiene and may have the same or different molecular weights; wherein the butadiene is polymerized to a 1,2 vinyl content of from 25 to 70% and wherein the initiator RLi is added in an amount such that the molar ratio between the initiator RLi and the living polymer ALi is in the range from 0.45 to 2.20; and (c) coupling the mixture of living polymers A-B-Li and $B^1$Li obtained with a multifunctional coupling agent.

14. Process according to claim 13 characterized in that the molar ratio between the initiator RLi and the living polymer ALi in step (b) is in the range of from 0.88 to 1.12.

* * * * *